(12) United States Patent
Impola et al.

(10) Patent No.: US 11,697,379 B2
(45) Date of Patent: Jul. 11, 2023

(54) PERCEPTION SYSTEM LIDAR AND CAMERA BRACKET

(71) Applicant: Caterpillar Paving Products Inc., Brooklyn Park, MN (US)

(72) Inventors: Todd A. Impola, Minnetonka, MN (US); Timothy M. O'Donnell, Long Lake, MN (US); Jacob J. McAlpine, Otsego, MN (US); John L. Marsolek, Watertown, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 609 days.

(21) Appl. No.: 16/810,147

(22) Filed: Mar. 5, 2020

(65) Prior Publication Data
US 2021/0276494 A1 Sep. 9, 2021

(51) Int. Cl.
| | |
|---|---|
| *B60R 11/04* | (2006.01) |
| *E01C 19/26* | (2006.01) |
| *F16M 13/02* | (2006.01) |
| *B60R 11/00* | (2006.01) |
| *G03B 17/56* | (2021.01) |
| *B62D 65/00* | (2006.01) |

(52) U.S. Cl.
CPC .............. *B60R 11/04* (2013.01); *B60R 11/00* (2013.01); *E01C 19/26* (2013.01); *F16M 13/02* (2013.01); *G03B 17/561* (2013.01); *B60R 2011/004* (2013.01); *B60R 2011/0049* (2013.01); *B60R 2011/0052* (2013.01); *B62D 65/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,731,897 | A * | 5/1973 | Price ..................... | G03B 17/561 396/419 |
| 3,855,602 | A * | 12/1974 | Hoos ...................... | G03B 15/03 396/422 |
| 4,081,814 | A * | 3/1978 | Bulland ................. | F16M 11/08 248/187.1 |
| 4,091,402 | A * | 5/1978 | Siegel ................... | G03B 17/563 396/422 |
| 4,255,036 | A * | 3/1981 | Pincetich ............. | G03B 17/563 396/422 |

(Continued)

FOREIGN PATENT DOCUMENTS

| | | |
|---|---|---|
| CN | 208172246 | 11/2018 |
| WO | 2018051906 | 3/2018 |

*Primary Examiner* — Monica E Millner
(74) *Attorney, Agent, or Firm* — Schwegman, Lundberg & Woessner

(57) ABSTRACT

A soil compactor machine can include: a machine frame; at least one cylindrical roller drum rotatably coupled to the machine frame and rotatable about a drum axis oriented generally transverse to a direction of travel of the compactor machine; a plurality of sensors mounting locations on the machine frame for mounting one or more lidar sensors and cameras; and a plurality of brackets, wherein, one of each of the plurality of brackets is positioned at each of the sensor mounting locations for mounting the lidar sensors and the cameras, wherein the bracket at each of the sensor mounting locations has a similar design as the other of the plurality of brackets.

8 Claims, 4 Drawing Sheets

(56) References Cited

U.S. PATENT DOCUMENTS

| | | | |
|---|---|---|---|
| 4,319,825 A * | 3/1982 | Newton | G03B 17/561 |
| | | | 396/428 |
| D302,697 S * | 8/1989 | Parrish | 396/428 |
| 8,345,154 B2 * | 1/2013 | Zhan | G03B 17/566 |
| | | | 348/375 |
| 2010/0157280 A1 | 6/2010 | Kusevic et al. | |
| 2011/0240701 A1 * | 10/2011 | Totani | B60R 11/00 |
| | | | 224/555 |

* cited by examiner

US 11,697,379 B2

PERCEPTION SYSTEM LIDAR AND CAMERA BRACKET

TECHNICAL FIELD

This disclosure relates to road construction equipment, and more specifically to a compactor machine with roller drums for traveling over a surface to be compacted.

BACKGROUND

Compactors are machines used to compact initially loose materials, such as asphalt, soil, gravel, and the like, to a densified and more rigid mass or surface. For example, soil compactors are utilized to compact soil at construction sites and on landscaping projects to produce a foundation on which other structures may be built. Most soil compactors include a rotatable roller drum that may be rolled over the surface to compress the material underneath. In addition to utilizing the weight of the roller drum to provide the compressive forces that compact the material, some compactors are configured to also induce a vibratory force to the surface.

Autonomous machines are machines that use a variety of sensors to detect the area around a machine so that the machine can operate without a driver or can be used to assist the driver while they operate the machine. For a compactor machine, a full 360° object detection system is needed for an autonomous vehicle. Lidar and camera sensors need to be placed on the machine in a specific locations to achieve the required field of view for object detection.

WO 2018/051906 describes a sensor system for a vehicle where a lidar and a camera are mounted on a bracket in the sensor system.

SUMMARY

In an example according to this disclosure, a soil compactor machine can include: a machine frame; at least one cylindrical roller drum rotatably coupled to the machine frame and rotatable about a drum axis oriented generally transverse to a direction of travel of the compactor machine; a plurality of sensors mounting locations on the machine frame for mounting one or more lidar sensors and cameras; and a plurality of brackets, wherein, one of each of the plurality of brackets is positioned at each of the sensor mounting locations for mounting the lidar sensors and the cameras, wherein the bracket at each of the sensor mounting locations has a similar design as the other of the plurality of brackets.

In another example, a sensor bracket for a compactor machine can include: a first portion; and a second portion angled relative to the first portion; wherein the second portion includes a lidar sensor mounting section and a central hole, and the second portion further includes a camera mounting section configured such that the camera can be mounted to either side of the second portion such that the bracket can be mounted in a first position for use with only a camera and can be mounted in a second, opposite position for use with both a lidar sensor and a camera.

In another example according to the present disclosure, a method of mounting one or more lidar sensor and cameras to a compactor machine can include: providing a common angle bracket configured to mount both cameras and lidars sensors to different locations on a roof of the soil compactor; wherein, if a camera only is needed, mounting the bracket such that a first side of the bracket is adjacent the roof and the camera is mounted to the first side; and if both a camera and a lidar sensor are needed, mounting the bracket such that a second side of the bracket is adjacent the roof and the camera is mounted to the second side of the bracket and the lidar sensor is mounted the first side of the bracket.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
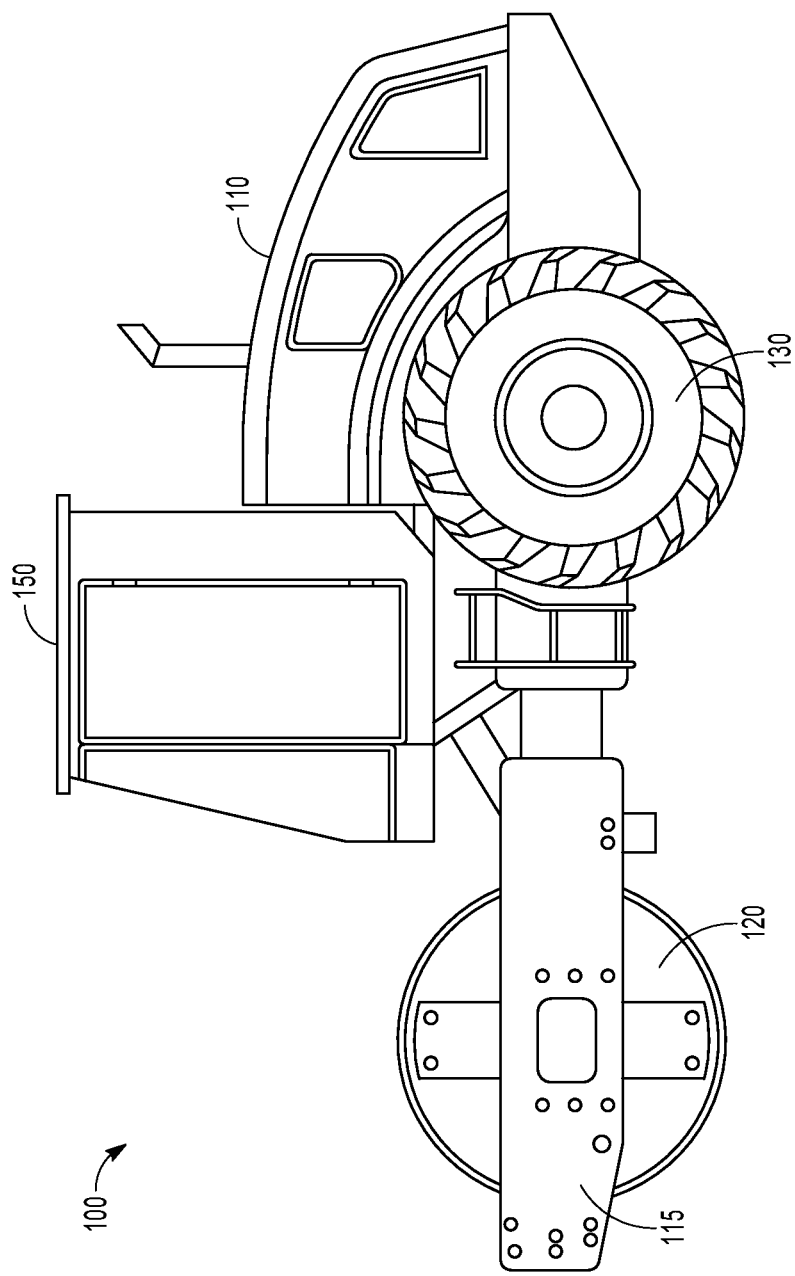
FIG. 1 shows a side view of a compactor machine, in accordance with one embodiment.

FIG. 1 shows a side view of a soil compactor machine 100, in accordance with one embodiment. The compactor machine 100 generally includes a body or machine frame 110 that connects and associates the various physical and structural features that enable the compactor machine 100 to function. These features can include an operator's cab 150 that is mounted on top of the machine frame 110 from which an operator may control and direct operation of the compactor machine 100. Accordingly, a steering feature and similar controls may be located within the operator's cab 150. To propel the compactor machine 100 over a surface, a power system such as an internal combustion engine can also be mounted to the machine frame 110 and can generate power that is converted to physically move the machine.

Compactor machine 100 can include at least a cylindrical roller drum 120 which is rotatable about a drum axis oriented generally transverse to a direction of travel of the compactor machine 100. The roller drum 120 is attached to the machine frame 110 using a drum support 115. In this example, the compactor machine 100 articulates such that the back section including a wheel 130 can articulate relative to the front section including the cylindrical drum 120.

Compactor machine 100 can be an autonomous or semi-autonomous machine. As such, a 360° object detection system can be needed for autonomous vehicles. Lidar and camera sensors need to be placed on the machine in specific locations to achieve the required field of view for object detection.

Figure 2:
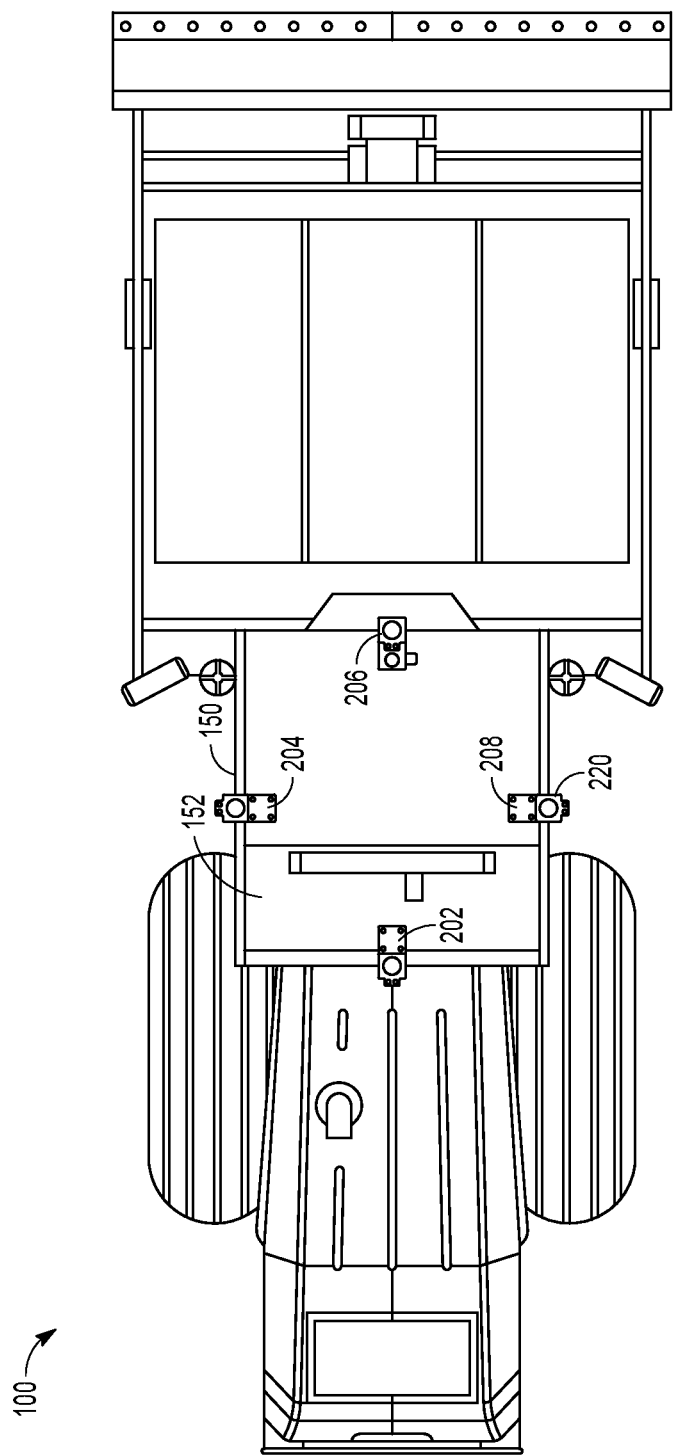
FIG. 2 shows a top view of a compactor machine, in accordance with one embodiment.

FIG. 2 shows a top view of the compactor machine 100, in accordance with one embodiment. Here, on a roof 152 of the cab 150 of the machine 100 are located a plurality of sensors mounting locations 202, 204, 206, 208 for mounting one or more lidar sensors and cameras. In this example, it is chosen that the front and back locations 202 and 206 need both a camera and lidar, while the side locations 204 and 208 only need a camera. The positions of these sensors create 360° coverage around the machine. As will be detailed below the present system uses a common bracket 220 positioned at each of the sensor mounting locations 202-206 wherein the common bracket 220 at each of the sensor mounting locations 202-206 has a similar design, but can be used in different configurations. Thus, a similar single-style bracket 220 can be used at all locations. By offering a single set of common brackets that can hold both cameras and lidar in all locations of the machine, the present system optimizes efficiency and eliminates the need for another style of bracket.

Figure 3:
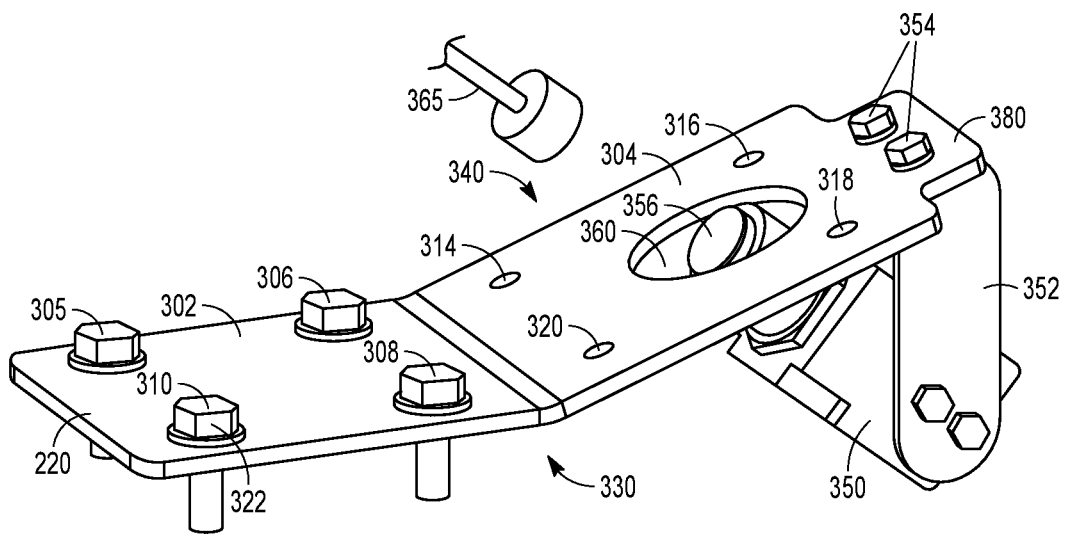
FIG. 3 shows a perspective view of a bracket, in accordance with one embodiment.
Figure 4:
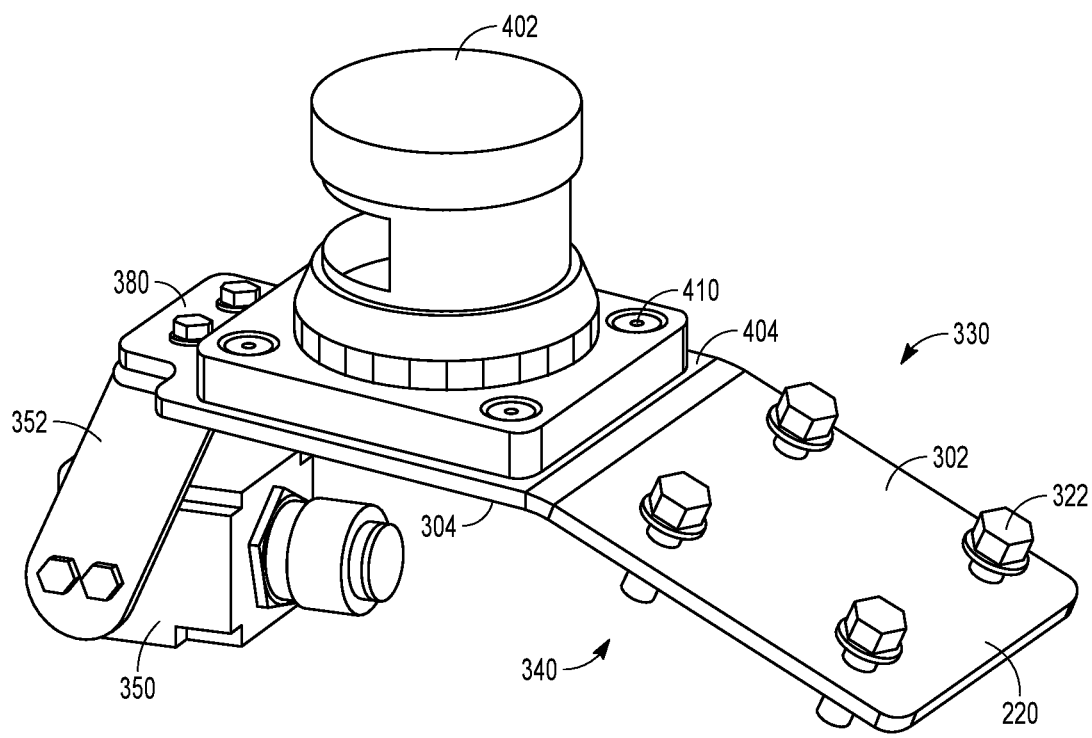
FIG. 4 shows a perspective view of the bracket of FIG. 3, in accordance with one embodiment.

FIG. 3 shows a perspective view of a bracket 220, in accordance with one embodiment. FIG. 4 shows a perspective view of the bracket of FIG. 3, in accordance with one embodiment.

Here, the bracket 220 is angled and can be mounted in a first position (FIG. 3) for use with only a camera 350 and can be mounted in a second, opposite position (FIG. 4) for use with both a lidar sensor 402 and the camera 350. As noted, above, in one example use, the camera only configuration can be on the sides of the compactor machine at locations 204 and 208 (FIG. 2) and the camera 350 and lidar sensors 402 configuration can be at locations 202 and 206 on the roof 152 of the cab 150.

In this example, the bracket 220 includes a first portion 302 and a second portion 304 angled relative to the first portion 302. First portion 302 is configured to be mounted to the roof of the cab while the second portion 304 holds the needed sensors. Accordingly, the second portion 304 includes a lidar sensor mounting section 404 where the lidar sensor 402 can be mounted using bolts 410 coupled at lidar sensor mounting apertures 314, 316, 318, 320. Second portion 304 further includes a camera mounting section 380 configured such that the camera 350 can be mounted to either side 330, 340 of the second portion 304 using bolts through camera mounting apertures 354. The camera mounting section 380 can include a camera mounting bracket 352 defining a pair of arms extending from the second portion 304 such that the camera 350 is positioned between the arms of the bracket 352. The bracket 352 is reversible such that it can mount to either side 330, 340 of the bracket 220.

The second portion 304 further includes a central hole 360 which allows for a power line 365 to attach to the camera at a camera connection 356.

Referring specifically to FIG. 3, if the camera 350 is located on the first side 330 of the second portion 304, the camera 350 is positioned such that the power line 365 can come through the central hole 360 and so attach to the camera connection 356 of the camera 350. A plurality of bolts 322 extend through bracket mounting apertures 305, 306, 308, 310 to mount the bracket to the roof 152 of the cab 150 so that the second portion 304 is angled upwards relative to the first portion 302 and the first side 330 of the bracket 220 is adjacent the roof 152.

Referring specifically to FIG. 4, if the camera 350 is located on the second side 340 of the second portion 304, the lidar sensor 402 is mounted on the first side 330 of the second portion 304 and covers the central hole 360. The bracket 220 is flipped over relative to FIG. 3 so that the second side 340 is adjacent the roof 152. Also, the camera mounting bracket 352 is reversed and is now mounted to the second side 340 of the bracket 220. Now the second portion 304 angles downward relative to the first portion 302. This provides the proper angle of sensor coverage for both the camera 350 and the lidar sensor 402 when the bracket 220 is mounted to the front and back of the compacter.

Thus, the present system allows the common bracket 220 to be used for both kinds of sensor mounting configurations. Referring again to FIG. 2, The bracket 220 can be used to hold both the camera 350 and lidar sensor 402 as a package.

In this case, on the front and the rear of the compactor 100, the lidar sensor 402 and the camera 350 mount onto two brackets 220. On both sides, there is no lidar sensor, just cameras 350. Since the angle of the cameras 350 on the side is much greater than in the front and rear, the bracket 220 can be flipped upside down, and the harness can route through the central hole 360 in the bracket 220. This makes the bracket 220 set very flexible as the same brackets 220 are used in all four mounting locations. The positions of these sensors create 360° coverage around the machine.

Figure 5:
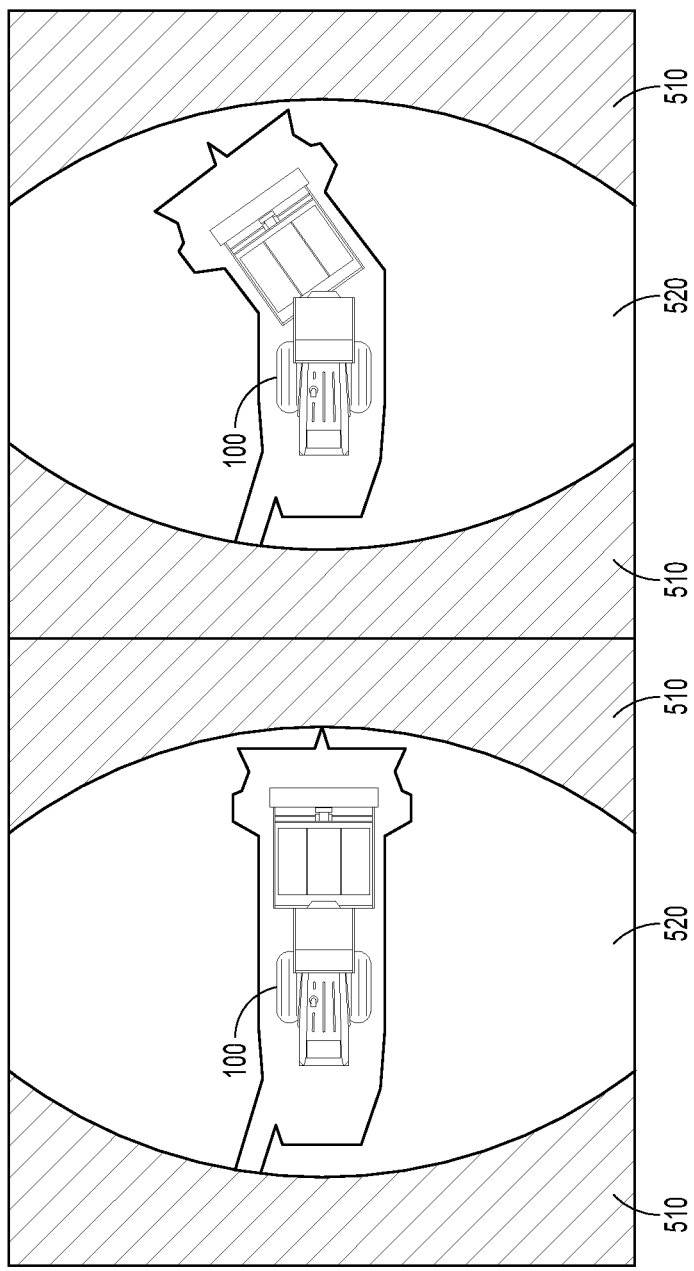
FIG. 5 shows a top view of the sensor coverage of the present system, in accordance with one embodiment.

For example, FIG. 5 shows a top view of the sensor coverage of the present system, in accordance with one embodiment. In this example, a sensing area 510 indicates the coverage provided by the front and rear sensor configuration, and a sensing area 520 indicates the camera coverage provided by the cameras on the sides of the machine. Accordingly, 360° coverage is provided.

INDUSTRIAL APPLICABILITY

The present system is applicable during many situations in road construction. As discussed, for a compactor machine, a full 360° object detection system is needed for an autonomous vehicle. Lidar and camera sensors need to be placed on the machine in a various specific locations to achieve the required field of view for object detection. If a different style bracket is need for each mounting configuration, the design would be inefficient and more costly.

In contrast, the present system uses a single bracket style for all configurations. For example, and referring to the compactor machine 100 and system discussed with regards to FIGS. 1-5, a method of mounting one or more lidar sensors and cameras to a compactor machine will be discussed. In this example, the method includes: providing a common angle bracket configured to mount both cameras and lidars sensors to different locations on a roof of the soil compactor. If a camera only is to be mounted, mounting the bracket such that a first side of the bracket is adjacent the roof with the camera mounted on the first side. If both a camera and a lidar sensor are to be mounted, mounting the bracket such that a second side of the bracket is adjacent the roof and the camera is flipped, and the camera is on the second side of the bracket and the and the lidar sensor is on the first side of the bracket.

As noted above, the present system allows for a similar single-style common bracket 220 to be used at all mounting locations. By offering a single set of common brackets that can hold either a camera or both cameras and lidars in all locations of the machine, the present system optimizes efficiency and eliminates the need for another style of bracket.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A sensor bracket for a compactor machine comprising:
a first portion; and
a second portion angled relative to the first portion, wherein the second portion extends from a first end connected to the first portion to a distal end;
wherein the second portion includes a lidar sensor mounting section and a central hole, and the second portion further includes a camera mounting section located at the distal end of the second portion and configured such that the camera is configured to mount to either side of the distal end of the second portion such that the bracket is configured to mount in a first position for use with only a camera and is configured to mount in a second, opposite position for use with both a lidar sensor and a camera.

2. The sensor bracket of claim 1, wherein bracket includes the central hole for a power line for the camera.

3. The sensor bracket of claim 1, wherein the bracket is configured to be mounted to a roof of the compactor machine.

4. The sensor bracket of claim 1, wherein the camera mounting section includes a pair of arms extending from the second portion such that camera is positioned between the arms.

5. The sensor bracket of claim 4, wherein if the camera is located on a first side of the second portion, the camera is positioned such that a power line comes through the central hole.

6. The sensor bracket of claim 4, wherein if the camera is located on a second side of the second portion, the lidar sensor is mounted on a first side of the second portion.

7. The sensor bracket of claim 1, wherein the first portion includes mounting bolt apertures.

8. The sensor bracket of claim 1, wherein the lidar sensor is mounted over the central hole.

\* \* \* \* \*